US007941110B2

(12) United States Patent
Gonzalez

(10) Patent No.: US 7,941,110 B2
(45) Date of Patent: May 10, 2011

(54) RF CIRCUIT WITH CONTROL UNIT TO REDUCE SIGNAL POWER UNDER APPROPRIATE CONDITIONS

(75) Inventor: David M. Gonzalez, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 755 days.

(21) Appl. No.: 11/849,124

(22) Filed: Aug. 31, 2007

(65) Prior Publication Data
US 2009/0029659 A1   Jan. 29, 2009

Related U.S. Application Data

(60) Provisional application No. 60/951,339, filed on Jul. 23, 2007.

(51) Int. Cl.
*H04B 1/04* (2006.01)
*H01Q 11/12* (2006.01)
(52) U.S. Cl. .................................. 455/127.5; 455/343.5
(58) Field of Classification Search .............. 455/127.1, 455/127.5, 129, 126, 343.1, 343.2, 343.3, 455/343.4, 343.5
See application file for complete search history.

(56) References Cited

U.S. PATENT DOCUMENTS

| | | | |
|---|---|---|---|
| 4,290,026 A | 9/1981 | Shoji | |
| 5,192,919 A | 3/1993 | Wieczorek | |
| 5,524,285 A | 6/1996 | Wray et al. | |
| 6,008,698 A * | 12/1999 | Dacus et al. | 330/279 |
| 6,430,402 B1 * | 8/2002 | Agahi-Kesheh | 455/115.3 |
| 7,058,139 B2 | 6/2006 | Duperray | |
| 7,062,237 B2 * | 6/2006 | Brandt | 455/127.1 |
| 2002/0065062 A1 * | 5/2002 | Levesque | 455/343 |
| 2004/0110542 A1 * | 6/2004 | Shozen | 455/572 |
| 2005/0093630 A1 | 5/2005 | Whittaker et al. | |
| 2005/0122166 A1 | 6/2005 | Premakanthan et al. | |
| 2005/0227646 A1 * | 10/2005 | Yamazaki et al. | 455/127.3 |
| 2006/0003716 A1 | 1/2006 | Hayashihara | |
| 2006/0128324 A1 | 6/2006 | Tan et al. | |
| 2007/0243846 A1 * | 10/2007 | Kirisawa | 455/317 |

FOREIGN PATENT DOCUMENTS

| | | |
|---|---|---|
| EP | 1237297 B1 | 9/2005 |
| JP | 09-046264 | 2/1997 |
| WO | 2005060451 A3 | 7/2005 |
| WO | 2006071265 A1 | 7/2006 |

OTHER PUBLICATIONS

International Search Report and Written Opinion correlating to PCT/US2008/070327, dated Dec. 3, 2008.

* cited by examiner

*Primary Examiner* — Edward Urban
*Assistant Examiner* — Christian A Hannon
(74) *Attorney, Agent, or Firm* — Jackson Walker L.L.P.

(57) ABSTRACT

A disclosed RF circuit includes a power amplifier that produces an RF output signal, a detector to generate a detector signal indicative of a power of the RF output signal, and an offset unit to produce an offset signal that indicates low supply voltage conditions. The power of the RF output signal is reduced, at least in part, by a control signal reflecting a combination of the detector signal and the offset signal. The circuit may include a transmitter to provide an RF input signal to the power amplifier. The transmitter may receive the control signal and adjust a power of the RF input signal based on the control signal. The detector may produce a control current indicative of the RF output signal power. The offset unit produces the offset signal based on a difference between the supply voltage and a nominal supply voltage value.

22 Claims, 2 Drawing Sheets

RF CIRCUIT WITH CONTROL UNIT TO REDUCE SIGNAL POWER UNDER APPROPRIATE CONDITIONS

PRIORITY CLAIM

This patent application claims priority from Provisional Patent Application No. 60/951339, filed Jul. 23, 2007; incorporated herein by reference.

BACKGROUND

1. Field

The disclosed subject matter is in the field of radio frequency (RF) circuits and, more particularly, battery-powered RF circuits for use in applications requiring linear power amplifier performance.

2. Related Art

RF circuits are prevalent in a larger number of applications including wireless or mobile telecommunications where one or more rechargeable batteries frequently provide the source of power for the RF circuit. RF circuits are well known to include transmitter units that produce an RF signal that is provided as an input to a power amplifier. The power amplifier amplifies and/or modulates the received signal to generate an RF output signal that is converted into electromagnetic waves and propagated into space via an antenna. Generally, a battery powered RF device includes a voltage regulator or power supply circuit that receives the voltage produced by the battery as its input and generates one or more supply voltages and/or reference voltages for the RF circuit.

A significant component of any RF transmitter is the power amplifier. The power amplifier produces the RF output signal that is propagated into space by means of an antenna. Linear power amplifier performance is important in conjunction with certain types of modulation schemes, including modulation schemes designed to provide high rates of data transfer including, as a popular example, the Global System for Mobile communication (GSM) Enhanced Data rates for GSM Evolution (EDGE) modulation, referred to herein as GSM-EDGE or simply EDGE.

When the amplitude of an RF output signal produced by a power amplifier approaches the power amplifier's supply voltage, the output signal may begin to compress. When signal compression occurs, the spectral purity of the signal begins to degrade and the linear operation of the power amplifier may degrade simultaneously. Even marginally non-linear power amplifiers may produce signals having characteristics that fail to meet certain specified requirements. Parameters most at risk of becoming non-compliant during a low battery condition in an EDGE modulation implementation are the Alternate Channel Power Ratio (ACPR) and the Error Vector Magnitude (EVM).

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
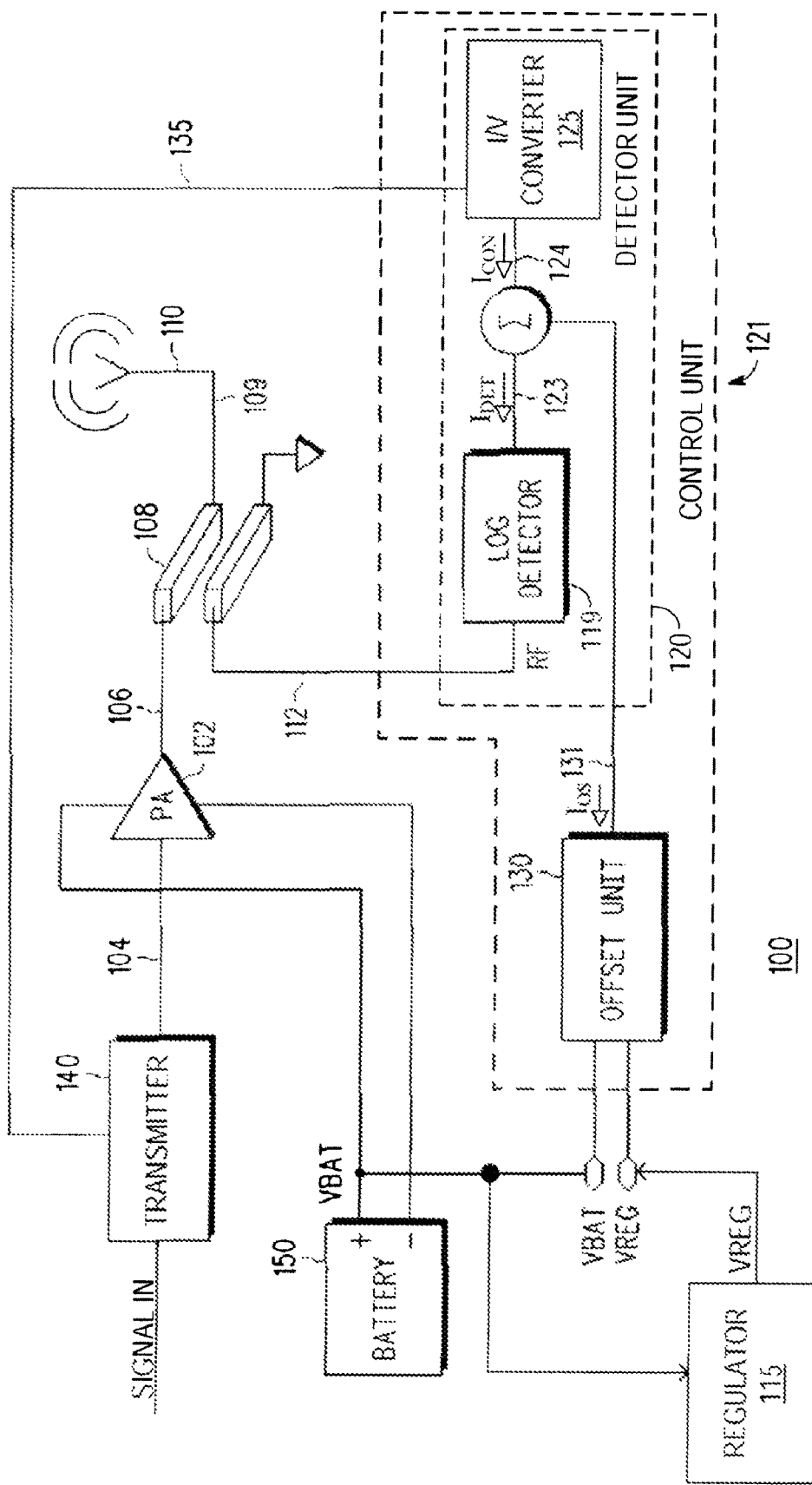
FIG. 1 is a block diagram of selected elements of an embodiment of an RF system including a control unit.

In one aspect, a disclosed RF circuit is operable to be powered by a supply voltage. The supply voltage may be provided by a battery that outputs a battery voltage. In some implementations, the battery voltage is applied to the RF circuit so that the supply voltage equals the battery voltage. The RF circuit includes a power amplifier that is powered by the supply voltage The power amplifier receives an RF input signal and produces an RF output signal. The RF circuit further includes a detector that generates a detector output signal. The detector output signal is indicative of the RF output signal power. An offset unit adjusts the detector output signal when a low battery voltage condition is encountered. The low battery voltage condition occurs when the supply voltage is below a specified threshold. In this manner, the RF output signal power is controlled at least in part by the adjusted detector signal. Moreover, because the adjusted detector output signal is influenced by the RF output signal power and the battery voltage, the RF output signal power is adjusted based at least in part on the current signal power and the battery voltage.

The disclosed RF circuit may include a transmitter operable to generate the RF input signal. The transmitter may be implemented as a transceiver that is operable as a receiver as well. In some embodiments, the adjusted control signal is provided to and received by the transmitter. In these embodiments, the transmitter may adjust the power level of the transmitter output signal, which is provided to the power amplifier as the RF input signal, based on the value of the adjusted control signal.

The disclosed RF circuit may include a coupler that receives the RF output signal. In some embodiments, the coupler produces a first coupled signal, which is provided to an antenna, and a second coupled signal, which is provided to an input of the detector. The detector may be an I/V converter that produces a control current indicative of the RF output signal power and, in some embodiments, a control current that is proportional to the logarithmic RF output signal power (expressed in dBm).

The control unit is operable to supplement the control current based at least in part on a difference between the battery voltage and a nominal value of the battery voltage. The supply voltage is generated from and/or determined by the battery voltage. The control circuit is operable to supplement the control current based on a difference between an actual battery voltage and a nominal battery voltage. The offset unit may be operable to adjust the control signal to reduce the RF output signal power sufficiently to ensure linear operation of the power amplifier despite the low supply voltage condition. In some embodiments, for example, the offset unit is operable to adjust the adjusted detector output signal to reduce the RF output signal power sufficiently to ensure compliance with ACPR and EVM requirements as specified under EDGE.

The disclosed RF circuit thus monitors the battery voltage and reduces the power of the RF output signal during low battery voltage conditions. A low battery voltage condition occurs when the battery voltage drops below a specified value. In some embodiments, the power of the RF output signal is decreased, in dBm, by an amount proportional to the amount by which the battery voltage is below nominal.

In some embodiments, empirical data indicates that the RF output signal power needs just 1.5 dB of attenuation when the battery voltage drops from 3.5 V to 3.0 V. The decrease in RF output signal power in exchange for improved linear performance of the power amplifier may be acceptable in certain environments. Accounting for reference voltage variation and circuit tolerances, it may be desirable to achieve 2 dB of power attenuation when the battery voltage drops from 3.5 to 3.0 V.

In another aspect, a disclosed transceiver or transmitter system suitable for use in an RF application includes a power amplifier that receives an RF input signal and produces an RF output signal having an RF output signal power. A battery provides a supply voltage to the power amplifier. A transmitter provides the RF input signal to the power amplifier. The system reduces the RF output signal power when it detects a battery voltage below a nominal voltage.

The system may determine a difference between the battery voltage and a nominal voltage. The RF output signal power reduction, in dBm, may be a linear or nonlinear function of the difference. In embodiments where the nominal voltage is approximately 3.5 V, the RF output signal power reduction may be in the range of approximately 3 db/V to approximately 4 db/V.

The disclosed system may include a control unit that receives an input signal that indicates the RF output signal power. The system may generate a control signal based on the RF output signal power and the battery voltage. The system may be operable to reduce the RF output signal power by providing the control signal to the transmitter. The transmitter is operable to reduce a power level of the RF input signal when the cut back circuit supplements the detector output signal. The control unit includes a detector that produces a detector signal based on the RF output signal power and an offset unit that supplements the detector signal when the battery voltage is below the nominal voltage.

The detector may generate a detector current indicative of the RF output signal power. The offset circuit sinks an offset current proportional to a difference between the battery voltage and the nominal voltage. The offset current supplements the detector current. The supplemental detection current is drawn through a feedback resistor of an operational amplifier of the detector to produce the control signal.

In still another aspect, a disclosed RF circuit includes a power amplifier that receives a supply voltage equal to or otherwise derived from a battery voltage. The RF circuit is further operable to produce an RF output signal. A control unit determines the battery voltage and the RF output signal power. The control unit may reduce the RF output signal power when a combination of the battery voltage and the RF output signal power are indicative of nonlinear power amplifier operation, for example, when the battery voltage drops below a nominal value or specified threshold and the power of the RF output power is high. The RF circuit further includes a transceiver that provides an RF input signal to the power amplifier. The control signal may be provided to the transceiver, in which case, reducing the RF output signal power may be achieved by adjusting the power of the RF input signal.

Referring now to FIG. 1, selected elements of an embodiment of an RF system 100 are depicted to emphasize the use of a control unit 121 to reduce or otherwise regulate the power of the RF output signal 106 when the system 100 is in an operational state that jeopardizes the linear operation of the system 100. For example the RF output signal power is reduced when a supply voltage drops below a specified threshold to avoid non-linear operation that may occur when the RF output signal amplitude approaches or exceeds the supply voltage. In cases where the supply voltage is provided by or derived from a battery, the power reduction may occur when the battery voltage drops below a specified threshold, e.g., a nominal value of the battery voltage. By reducing the power of RF output signal 106 when the battery voltage drops below a nominal value, the disclosed RF circuit preserves linear operation in exchange for a modest decrease in RF output signal power.

The power tradeoff is especially desirable in EDGE and other digital wireless technologies that enable high data transmission rates. EDGE modulation, for example, employs 8 phase shift keying (8 PSK) for the upper five of its nine modulation and coding schemes. Faithful EDGE operation requires a spectrally pure RF output signal. When the RF output signal amplitude approaches the supply voltage, signal compression degrades the spectral purity and jeopardizes compliance with at least two linearity specifications, namely, ACPR and EVM.

The elements of RF system 100 shown in FIG. 1 include a power amplifier 102 that receives an RF input signal 104 from a transmitter 140 and produces an RF output signal 106. Although labeled as a transmitter, transmitter 140 may be implemented as an integrated transmitter/receiver, i.e., a transceiver. RF system 100 as depicted further includes a battery 150 that generates a battery voltage ($V_{BAT}$). In the depicted embodiment, the battery 160 is connected directly to the power terminals of power amplifier 102 so that the supply voltage for power amplifier 102 is $V_{BAT}$.

RF output signal 106 as shown in FIG. 1 is delivered to a coupler 108, which couples a first portion 109 of RF output signal 106 to antenna 110 for transmission. Coupler 108 also couples a second portion of RF output signal 106, referred to herein as RF sample signal 112, to a detector unit 120 of the control unit 121.

Control unit 121 produces a control signal 136 that RF system 100 uses to regulate the power of RF output signal 106. In the depicted embodiment, control of RF output signal power is achieved pre-amplification, by controlling the power of the RF input signal 104 generated by transmitter 140. In this embodiment, control signal 135 is delivered to transmitter 140. Transmitter 140 controls the power of RF input signal 104 based, at least in part, on the magnitude or other characteristic of control signal 135.

In the embodiment depicted in FIG. 1, the detector unit 120 of control unit 121 includes a log detector 119 that produces a detector current ($I_{DET}$) 123 based on the power of RF output signal 106. Control unit 121 also includes an offset unit 130 that produces an offset current ($I_{OS}$) 131 based on the battery voltage $V_{BAT}$. The two currents are added together to obtain a control current $I_{CON}$ 124. $I_{CON}$ 124 is converted to control signal 135, a voltage, by a current-to-voltage block 125.

When $V_{BAT}$ is equal to or greater than its nominal value, $I_{OS}$ 131 is zero. When $I_{OS}$ 131 is zero, control signal 135 is determined solely by $I_{DET}$ 123, i.e., $I_{CON}=I_{DET}$. RF system 100 preserves linear operation in certain operational states by supplementing the $I_{DET}$ 123 with a non-zero value of $I_{OS}$ 131 to increase the magnitude of $I_{CON}$ 124. The larger magnitude of $I_{CON}$ 124 results in an increased value of control signal 135. Transmitter 140 interprets increases in the magnitude control signal 135 as representing an increase in the power of RF output signal 106. Transmitter 140 will respond by attenuating the power of RF input signal 104. Increasing the magnitude of control signal 135 when $V_{BAT}$ drops below a nominal value or below another specified threshold enables control unit 121 to preserve linear operation by causing a reduction in the power of RF output signal 106 during lower battery voltage states.

Offset unit 130 as shown in FIG. 1 receives the battery voltage $V_{BAT}$ and a regulated voltage $V_{REG}$ as its inputs. $V_{REG}$ may be produced from $V_{BAT}$ by a conventional switch-mode or linear regulator 115. As suggested by its name, $V_{REG}$ is a relatively stable voltage that provides a reference signal. In some embodiments, the ratio of $V_{REG}$ variation to $V_{BAT}$ variation is 10% or less. Offset unit 130 produces the offset current $I_{OS}$ 131 based on the values of $V_{BAT}$ and $V_{REG}$. Under the assumption that $V_{REG}$ is relatively invariant, $I_{OS}$ 131 is largely a function of the battery voltage $V_{BAT}$. Specifically, as described in greater detail with respect to FIG. 2, the magnitude of $I_{OS}$ 131 increases as $V_{BAT}$ drops below a specified threshold. Offset unit 130 controls the magnitude of $I_{OS}$ 131 to cause an RF signal power reduction during low battery voltage operation. In some embodiments, the reduction in power of RF output signal 106 caused by $I_{OS}$ 131 is sufficient to preserve the linearity of power amplifier 102 and the spectral purity of RF output signal 106 during low battery voltage operation so that linearity parameters including ACPR and EVM remain compliant with the applicable specifications during low battery voltage operation.

Figure 2:
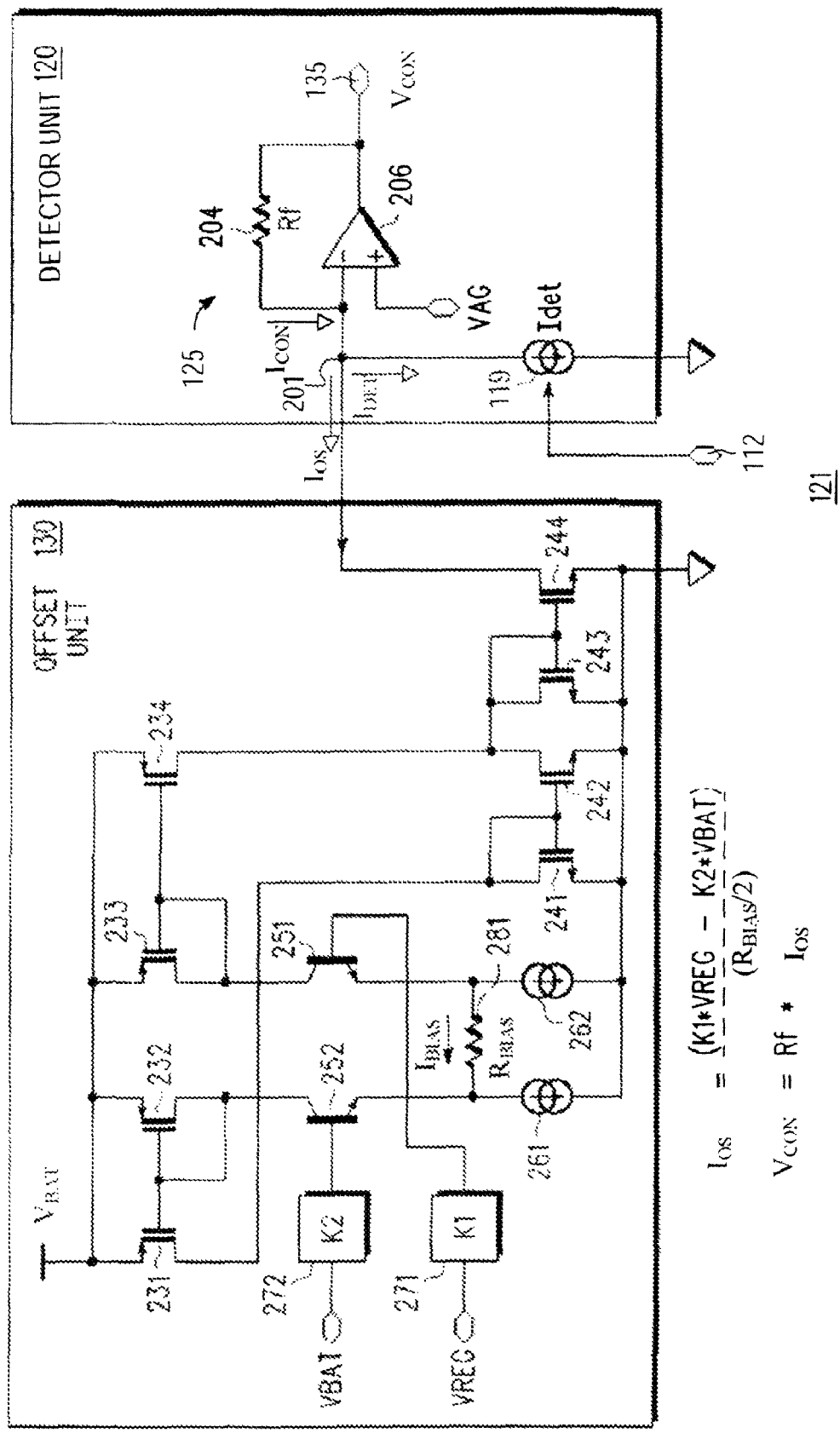
FIG. 2 is circuit diagram of selected elements of an embodiment of the control unit of FIG. 1.

Referring now to FIG. 2, selected components of an embodiment of control unit 121 are illustrated. In the depicted embodiment of control unit 121, detector unit 120 includes a detector 119 that produces detector current ($I_{DET}$) based on the power of sample signal 112. Detector 119 is referred as log detector 119 in embodiments where $I_{DET}$ is logarithmically related to power of sample signal 112. Because the power of sample signal 112 reflects the power of RF output signal 106 the magnitude of $I_{DET}$ 123 is indicative of the power of output signal 106.

In the implementation of detector unit 120 shown in FIG. 2, I/V converter 125 includes an operational amplifier (op amp) 206 and a feedback resistor Rf 204 connected between the output of op amp 206 and an inverting input of op amp 206. The non-inverting input of op amp 206 is grounded through a connection to an analog ground ($V_{AG}$). Assuming an ideal or nearly ideal op amp 206, those of ordinary skill in the field of circuit design will appreciate that the current through resistor Rf 204 is the control current $I_{CON}$ and that the voltage of control signal 135 is equal to $I_{CON}$*Rf.

Applying Kirchoff's current law to node 201, assuming an idealized op amp 206, $I_{CON}=I_{DET}+I_{OS}$. In the absence of offset unit 130, $I_{OS}$ is equal to 0 and the voltage across feedback resistor Rf 204 and, therefore, the voltage of control signal 135 is determined solely by $I_{DET}$ 123. In other words, control signal 135 is determined solely by the RF output signal power in the absence of offset unit 130. Offset unit 130 as shown supplements $I_{CON}$ 124 based at least in part on the voltage ($V_{BAT}$) of battery 150. In the depicted embodiment the offset current $I_{OS}$ 131 generated by offset unit 130 flows into node 201 and through feedback resistor Rf 204. $I_{OS}$ 131 therefore increases the voltage of control signal 135 according to Ohm's law.

In the depicted embodiment of offset unit 130, the value of offset current $I_{OS}$ 131 is indicative of a difference between the battery voltage $V_{BAT}$ and the regulated voltage $V_{REG}$. As a regulated voltage, $V_{REG}$ is relatively stable across a wide range of $V_{BAT}$ values. In an exemplary embodiment, for example, the variation in $V_{REG}$ may be approximately 3% or less. $V_{BAT}$ may vary much more significantly, but it is desirable to maintain operation across the widest possible range of $V_{BAT}$. By supplementing the detector output signal, i.e., $I_{DET}$ 123 during low battery voltage operation, offset unit 130 facilitates linear operation of RF system 100 even when $V_{BAT}$ falls well below a nominal value.

The depicted embodiment of offset unit 130 includes PMOS transistors 231 through 234, NMOS transistors 241 through 244, npn bipolar transistors 251 and 252, constant current sources 261 and 262, voltage dividers 271 and 272, and a bias resistor 281 having a resistance of $R_{BIAS}$, all connected as shown.

Voltage divider 271, which has a ratio of K1, produces a voltage K1*$V_{REG}$ at the base terminal of transistor 251. Voltage divider 272, which has a ratio of K2, produces a voltage K2*$V_{BAT}$ at the base terminal of npn transistor 252. Assuming that the base-emitter voltages for transistors 251 and 252 are approximately equal during normal operation, the difference in voltage between the base terminals of transistors 251 and 252 is effectively applied across the bias resistor 281. Thus, the current ($I_{BIAS}$) through bias resistor $R_{BIAS}$ 281 is:

$$I_{BIAS}=[(K1*V_{REG})-(K2*V_{BAT})]/R_{BIAS}$$

It can also be shown that the offset current $I_{OS}=2*I_{BIAS}$ in the following description where $T_{XYZ}$ refers to transistor XYZ in FIG. 2 and $I_{XYZ}$ refers to the collector current for transistors 251 and 252 and to the source/drain current for MOS transistors 231-234 and 241-244.

$T_{252}$ is in series with $T_{232}$ so that the collector current $I_{252}$ of $T_{252}$ equals source/drain current $I_{232}$. $T_{231}$ and $T_{232}$ are configured as a current mirror in which $I_{232}$ is mirrored in $T_{231}$ so that $I_{231}$ equals $I_{232}$, assuming transistors $T_{232}$ and $T_{231}$ are both saturated. $T_{241}$ is in series with $T_{231}$ so that $I_{241}$ equals $I_{231}$. $T_{241}$ and $T_{242}$ are configured as a current mirror so that $I_{241}$ is mirrored in $T_{242}$ as $I_{242}$. Thus, $I_{242}$ is equal to $I_{252}$, the collector current of $T_{252}$.

Similarly, $T_{251}$ is in series with $T_{233}$ so that the collector current $I_{251}$ of $T_{251}$ equals $I_{233}$, the source/drain current of $T_{233}$. $I_{233}$ is mirrored in $T_{234}$ so that $I_{234}$ equals $I_{233}$, assuming $T_{233}$ and $T_{234}$ are both saturated. $T_{234}$ is in series with the parallel combination of $T_{242}$ and $T_{243}$ so that $I_{234}$ equals the sum of $I_{242}$ and $I_{243}$. Thus, $I_{234}$ is equal to the sum of $I_{242}$ and $I_{243}$.

$T_{241}$ and $T_{242}$ are, however, configured as a current mirror so that $I_{242}$ equals $I_{241}$. $I_{234}$, therefore, represents the collector current of $T_{252}$, $I_{242}$ represents the collector current of $T_{251}$, and $I_{243}$ represents the difference between the two collector currents. $T_{243}$ and $T_{244}$ are configured as a current mirror so that $I_{OS}$, the source/drain current of $T_{244}$, is the mirror of $I_{243}$. Thus $I_{OS}$ is equal in magnitude to the difference in the collector currents of $T_{252}$ and $T_{253}$.

Assuming sufficiently large values of BETA, the emitter currents of $T_{251}$ and $T_{252}$ are approximately equal to their respective collector currents. Assuming further that the current sources 261 and 262 are approximately equal, it can be shown trivially that the difference between the emitter currents of $T_{251}$ and $T_{252}$ is twice the bias current $I_{BIAS}$. Therefore, the offset current $I_{OS}$ is substantially equal to twice the bias current $I_{BIAS}$ and, therefore:

$$I_{OS}=[(K1*V_{REG})-(K2*V_{BAT})]/(R_{BIAS}/2)$$

In some embodiments, K1 and K2 are implemented such that K1*$V_{REG}$=K2*$V_{BAT}$, when $V_{BAT}$ is equal to its nominal voltage. In these embodiments, offset unit 130 sinks $I_{OS}$ when $V_{BAT}$ is below its nominal value and the magnitude of $I_{OS}$ is proportional to the difference between $V_{BAT}$ and its nominal value. $I_{OS}$ increases $I_{CON}$, which flows through feedback resistor Rf 204 and increases the voltage of output signal 136 ($I_{OS}$*Rf). When $V_{BAT}$ equals or exceeds the nominal value, $I_{OS}$ drops to zero since negative drain current cannot flow through NMOS transistor 244. When $I_{OS}$ is zero, the voltage of control signal 135 is determined solely by $I_{DET}$ 123. In this manner, offset unit 130 increases the voltage of control signal 135 to reduce RF signal power when battery voltage is low. When $V_{BAT}$ is nominal, the control unit prohibits non-zero values of $I_{OS}$ and the detector circuit is solely responsible for generating control signal 135. Since higher values of control signal 135 produce lower RF signal power, the RF signal power will be attenuated based on $V_{BAT}$ when $V_{BAT}$ is low.

Offset unit 130 as shown does not illustrate a disable mechanism. In some cases, it may be desirable to disable offset unit 130 so that it does not sink any offset current even when $V_{BAT}$ is low. If, for example, the RF output signal power were not sufficiently high to jeopardize the linearity of the RF signal, it may be desirable to disable offset unit 130 to prevent it from reducing the RF signal power when doing so is not necessary. In some cases, this objective may be achieved via software control that is not visible in FIG. 2. In other cases, RF system 100 may include hardware not shown in FIG. 2 to prevent offset unit 130 from drawing current during low power operation of the power amplifier. For example, control unit 121 as shown in FIG. 2 might include a comparator and a pass transistor where the comparator is configured to compare output signal 135 to a threshold value to produce an output that controls the gating of the offset current $I_{OS}$. In this embodiment, offset unit 130 may be effectively disabled when RF signal power is low.

Although the invention is described herein with reference to specific embodiments, various modifications and changes can be made without departing from the scope of the present invention as set forth in the claims below. For example, although an RF circuit is described as having a transceiver, a transmitter and receiver may be used instead. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An RF circuit driven by a supply voltage, comprising:
    a power amplifier operable to receive an RF input signal and to produce an RF output signal;
    a detector operable to generate a detector signal having a current indicative of a power of the RF output signal; and
    an offset unit operable to generate an offset signal having a current indicative of a low supply voltage condition in which the supply voltage is below a specified threshold;
    wherein the power of the RF output signal is controlled at least in part by a control signal indicative of a control signal current, wherein the control signal current is equal to a sum of the detector signal current and the offset signal current.

2. The RF circuit of claim 1, wherein the RF circuit adjusts the control signal to cause a reduction in the power of the RF output signal in response to the offset signal indicating the low supply voltage condition.

3. The RF circuit of claim 2, wherein a magnitude of the offset signal is indicative of a magnitude of a difference between the specified threshold and the supply voltage.

4. The RF circuit of claim 1, further comprising a transmitter operable to generate said RF input signal and configured to receive the control signal, wherein the transmitter is configured to cause a reduction in a power of the RF input signal in response to the control signal reflecting the low supply voltage condition.

5. The RF circuit of claim 1 wherein the detector signal varies with the power of the RF output signal and further wherein the offset signal varies with a magnitude of a difference between a nominal voltage and the supply voltage.

6. The RF circuit of claim 5, wherein the detector signal current varies logarithmically with the power of the RF output signal and the offset signal current varies linearly with the magnitude of the difference between the nominal voltage and the supply voltage.

7. The RF circuit of claim 5, wherein said supply voltage is determined by a battery voltage and wherein the offset signal varies with a difference between an actual battery voltage and a nominal battery voltage.

8. The RF circuit of claim 5, wherein the offset unit is operable to cause an increase in the control signal current, in response to detecting the low supply voltage condition.

9. The RF circuit of claim 5, wherein the offset unit is operable to cause an increase in the control signal current to reduce the RF output signal sufficiently to ensure compliance with Alternate Channel Power Ration (ACPR) and Error Vector Magnitude (EVM) requirements of a Global System for Mobile communication (GSM) Enhanced Data rate for GSM Evolution (EDGE) specifications.

10. A transmitter system suitable for use in an RF application, comprising:
    a power amplifier operable to receive an RF input signal and produce an RF output signal, said RF output signal characterized by an RF output signal power and wherein the power amplifier is configured to receive a supply voltage based on a battery voltage from a battery;
    a control unit operable to produce a control signal; and
    a transmitter operable to change the RF output signal power by changing the RF input signal and further operable to control the RF output signal power based on said control signal;
    wherein the control signal is indicative of a control signal current provided to a control node of the control unit and wherein the control node sources a current of a detector signal, indicative of a power of the RF output signal, and a current of an offset signal, indicative of the battery voltage.

11. The system of claim 10, wherein the offset signal is indicative of a difference between the battery voltage and a nominal voltage.

12. The system of claim 11, wherein said nominal voltage is approximately 3.5 V and wherein the transmitter is configured to reduce the RF output signal power by more than approximately 3 db/V when the battery voltage drops below the nominal voltage.

13. The system of claim 12, wherein the transmitter is configured to reduce the RF output signal power by less than approximately 4 db/V.

14. The system of claim 11, wherein the control unit includes a detector operable to draw the detector signal current from the control node based on said RF output signal power and an offset unit operable to draw the offset signal current from the control node when said battery voltage is below said nominal voltage.

15. The system of claim 14, wherein the offset signal is proportional to a difference between the battery voltage and the nominal voltage.

16. The system of claim 15, wherein the detector signal current and the offset signal current are provided to the control node through a feedback resistor of an operational amplifier to produce the control signal.

17. An RF circuit, comprising:
    a power amplifier operable to receive a supply voltage produced by a battery and further operable to produce an RF output signal; and
    a control unit operable to produce a control signal indicative of a control signal current that includes an offset component indicative of the supply voltage and a power component indicative of the power of the RF output signal wherein the control unit includes a control node that sinks the control signal current and sources the offset component and the power component;

wherein the RF circuit is operable to control the RF output signal power based at least in part on the control signal.

18. The RF circuit of claim 17, wherein the RF circuit is operable to disable the offset component when the RF output signal power is low.

19. The RF circuit of claim 17, wherein the offset component is indicative of nonlinear power amplifier operation when the supply voltage drops below a nominal voltage.

20. The RF circuit of claim 17, further comprising a transmitter operable to provide an RF input signal to the power amplifier, wherein the control signal is provided to the transmitter and the transmitter is operable to adjust a power of the RF input signal based at least in part on the control signal.

21. The RF circuit of claim 17, wherein the offset component is generated by an offset unit and wherein the offset unit is operable to receive the supply voltage and a reference voltage, and wherein the offset unit includes:
  a first voltage divider circuit to receive the reference voltage and produce a first base current that is input to a first transistor to generate a first collector current;
  a second voltage divider circuit to receive the supply voltage and produce a second base current that is input to a second transistor to generate a second collector current wherein a difference between the first collector current and the second collector current is indicative of a difference between the supply voltage and the reference voltage;
  first mirroring circuits to mirror the first collector current in a first MOS transistor;
  second mirroring circuits to mirror the second collector current in a second MOS transistor;
  wherein the first and second MOS transistors are arranged in series and wherein a third MOS transistor is arranged in parallel with the second MOS transistor, wherein a current through the third MOS transistor is substantially equal to a difference between the first and second collector currents; and
  a third mirroring circuit to mirror the third MOS transistor current in a fourth MOS transistor; and
  wherein the offset component comprises the current in the fourth MOS transistor when a source/drain terminal of the fourth MOS transistor is connected to the control node.

22. The RF circuit of claim 21, further comprising a biasing resistor connected between emitters of the first and second transistors wherein a current through the biasing resistor current is substantially half of the difference between the first and second collector currents.

* * * * *